Nov. 5, 1935.  C. R. WASEIGE  2,020,224
INTERNAL COMBUSTION ENGINE
Filed Sept. 30, 1930  2 Sheets-Sheet 1

Fig. 1.

INVENTOR
*Charles Raymond Waseige.*
BY
*F. L. Smith*
ATTORNEY

Nov. 5, 1935.    C. R. WASEIGE    2,020,224
INTERNAL COMBUSTION ENGINE
Filed Sept. 30, 1930    2 Sheets-Sheet 2
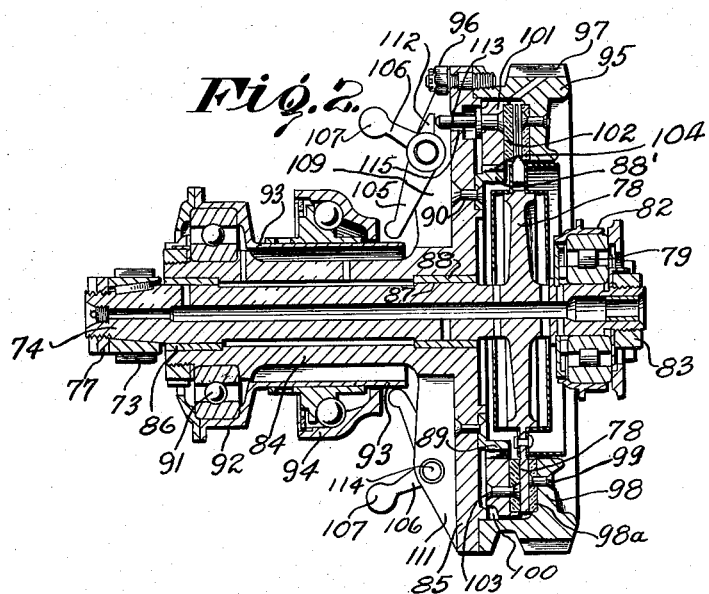
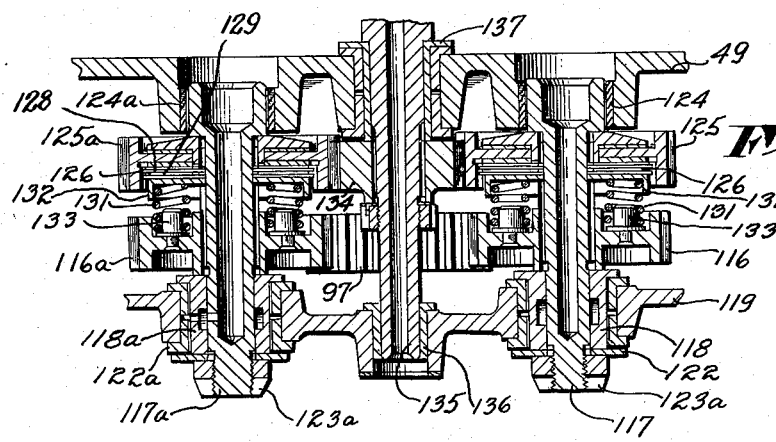
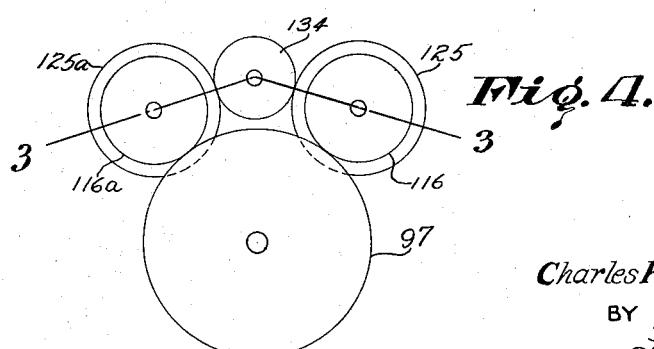
INVENTOR
Charles Raymond Waseige.
BY
ATTORNEY Patented Nov. 5, 1935

2,020,224

UNITED STATES PATENT OFFICE 2,020,224

INTERNAL COMBUSTION ENGINE

Charles Raymond Waseige, Rueil, France, assignor to Eclipse Aviation Corporation, East Orange, N. J., a corporation of New Jersey Application September 30, 1930, Serial No. 485,485

6 Claims. (Cl. 123—119)

This invention relates to a method and apparatus for supplying fuel to an internal combustion engine.

It has heretofore been proposed to provide internal combustion engines, and particularly engines employed on aircraft, with superchargers in an effort to maintain sea-level pressure in the intake manifold whereby loss of power in rarefied atmosphere is reduced. Considerable power is required to drive the supercharger and if the latter is designed to secure the desired result at very high altitudes a large amount of engine power is lost when operating at the intermediate altitudes where a portion only of the supercharger output is required. Furthermore, superchargers of the type used heretofore have, for the most part, required changes in the design and construction of the engines on which the same are mounted, thus adding greatly to the cost of the installation.

One of the objects of the present invention is to provide novel supercharging mechanism which is so constructed as to overcome the above-mentioned difficulties.

Another object of the invention is to provide novel supercharging means embodying a plurality of compressor units adapted to conjoint actuation at the will of the operator.

Another object is to provide in combination with a continuously driven compressor unit, a second unit adapted to be driven at high speed and rendered operable at the desired altitude by the operator.

A further object is to provide novel driving and control means for the selectively operable supercharger or compressor unit.

A still further object is to provide a novel method for supplying a combustible mixture to an internal combustion engine whereby the desired temperature of the mixture is maintained and the desired intake manifold pressure is maintained at high altitudes.

Other objects include the provision of novel supercharging means adapted to be installed as a unit; to provide a structure which may be applied to existing engines without changes in the design thereof; to provide a compressor unit adapted to be driven from power transmitting means associated with the engine starter; and to provide a rugged and dependable mechanism so constituted that the high speed compressor unit is protected against crank shaft vibration. The above and other objects will appear more fully hereafter in the detailed description of the invention.

One structural embodiment of the invention adapted to carry out the novel method is shown in the accompanying drawings, wherein like reference characters refer to like parts throughout the several views. It is to be expressly understood, however, that the drawings are for purposes of illustration only, and are not designed as a definition of the limits of the invention, reference being had for this purpose to the appended claims.

In the drawings:

Fig. 1 is an axial view in section of one embodiment of the invention;

Fig. 2 is an enlarged sectional detail of a portion of the yielding driving means shown in Fig. 1;

Fig. 3 is a sectional view taken along the line 3—3 of Fig. 4; and

Fig. 4 is a diagrammatic view of a portion of the speed increasing means which may be employed for driving the high speed compressor unit.

In the form shown, the structure of the present invention is associated with the rear end of an internal combustion engine having a shaft 10 mounted in any suitable manner in the crank case a portion of which is shown at 12 and having a flange adapted to be driven by crank pin 9 of the engine crankshaft. Secured to the crank case is a diffuser casing 13, and an outer crank case casing 14. Mounted on the end of shaft 10 is a gear 15 rigidly fixed thereto in any desired manner. The gear 15 meshes with a gear 17 disposed on the inner end of a shaft 18 journaled in the diffuser casing 13 and the outer crank case casing 14, and is provided with bearing surfaces 19 and 21 disposed in the casings 13 and 14, respectively. The rear end of the shaft 18 is provided with an engine starter engaging member 22 which was originally adapted for engagement with a member of an engine starter. The gear 15 also meshes with a pinion 23, which is preferably an integral part of a gear 24, rotatably mounted on a shaft 25 supported by the diffuser casing at its outer end and by the housing 12 at its inner end, and mounted thereon in any suitable manner. The gear 24 meshes with a pinion 26 rigidly fixed to or forming a part of an impeller shaft 27 mounted in the diffuser casing 13 by means of bearings 28 and 29. An impeller 34 is rigidly fixed to the outer end of the shaft 27 and adapted to rotate therewith. Impeller 34 is thus continuously driven from the crank shaft gear 15 through pinion 23, gear 24, pinion 26, and shaft 27.

A carburetor 35, of any selected type, is attached to the casing 14 by means of bolts 30, the fuel passage of the carburetor 35 being adapted to register with the fuel passage 36 leading to the impeller 34. Formed between the diffuser casing and casing 14, is a diffuser section 37 leading to a fuel collector 38 formed at the periphery of the diffuser section by the diffuser casing and casing 14. The collector 38 is provided with radial, flanged openings 41 into which extend radial pipes 42 leading to corresponding radial cylinders (not shown) of the engine.

The impeller 34 will operate to thoroughly commingle the mixture of air and fuel from the carburetor and further serve to deliver the mixture to the intake manifold of an engine at a pressure greater than atmospheric whereby the engine will operate at full sea-level power up to an altitude where the impeller will deliver the fuel mixture to the manifold at a pressure substantially the same as atmospheric pressure. When an altitude is reached such that the impeller 34 is ineffective to maintain the desired pressure in the intake a second supercharger is provided which is operated at the will of the operator to augment the impeller 34 and thus maintain sufficient fuel pressure within the engine manifold as the altitude of the engine increases.

For carrying out the above operation, the removable unitary structure 11 is provided including a mounting plate 43 disposed on the outer end of the casing 14, instead of the usual cover plate, and removably secured thereto by any suitable means such as screws 14ª, a novel yielding clutch having a casing 44 removably secured to the mounting plate 43 by any suitable means such as screws 43ª, said casing 44 being provided with a cylindrical opening 45 having an outwardly extending cylindrical flange 46, a suitable engine starter 47, such as that illustrated and described in Patent No. 1,741,370 issued to R. P. Lansing dated December 31, 1929 attachably secured to the flange 46 by means such as bolts 48, and a supercharger having a casing 49 attachably secured to the clutch casing by suitable means such as screws 44ª.

An engaging member 52 of the starter 47 is normally held in a retracted position and is drivably connectible to the engine crank shaft for rotating the same through a cooperating engaging member 53 rigidly fixed to the upper end of shaft 54, the latter being rotatably disposed in bearings 55 and 56 mounted in bearing brackets 57 on the casing 44. The lower end of the shaft 54 is provided with a gear 58 fixed thereto by splines 59 and retained thereon by threaded means 61. The gear 58 meshes with a gear 62 fixed to an extension shaft 63 by splines 64 and retained thereon by threaded means 65. Shaft 63 is rotatably supported in bearings 66 and 67 mounted in bearing brackets 68 on the mounting plate 43. The inner end of the shaft 63 carries an engaging member 69 rigidly fixed thereon and adapted to drivably engage the engaging member 22 on the shaft 18.

It can be seen, therefore, that the crank shaft of the engine may be rotated by the starter through the cooperating engaging members 52 and 53, shaft 54, gears 58 and 62, shaft 63, engaging members 69 and 22, shaft 18, and gear 17 which meshes with gear 15 on the engine crank shaft.

The rotor 51 of the supercharger is drivably connected to the engine crank shaft and, since the engine energy is so great that damage would result to the supercharger parts at the time the rotor is connected to the engine if said rotor were rigidly connected to said engine, a yielding driving connection is provided between the engine crank shaft and the supercharger rotor. In the form shown, the yielding driving connection is constituted by a novel clutch, which will be better understood as the specification progresses.

The rotor 51 is drivably connected with the engine crank shaft through shaft 63 which is provided with a gear 71 rigidly splined thereon as shown at 72. The gear 72 meshes with a pinion 73 splined on a shaft 74 of the yielding connection represented in its entirety by 76 and retained thereon by a threaded means 77.

The yielding clutch 76 comprises a circular disc 78 rigidly fixed to or forming an integral part of shaft 74 (Fig. 2), the disc being disposed at substantially right angles to the axis of the shaft. The latter is rotatably supported at its outer end in bearing 79 mounted in a bearing bracket 81 on the casing 44. Suitable retaining sleeves 82 and threaded means 83 are provided for maintaining the bearing 79 in its proper position. The shaft 74 extends through a hollow shank 84 of a weight-carrying member 85 and is rotatably supported at the inner end of the hollow shank 84 by bearings 86 pressed into an inner recess in the inner end of the shank 84. The weight-carrying member 85 is rotatably supported on an enlarged portion 87 of shaft 74 by means of a bearing 88 pressed into an inner recess of the outer end of the hollow shank 84, the bearing 88 being maintained in its proper position by gear 89 loosely disposed on the shaft 74 and rigidly fixed to the outer face of the weight-carrying member 85 by means of rivets 90, the inner end of the hollow shank 84 being rotatably supported in bearing 91 mounted in the casing 44 and retained in its proper position by means of a cylindrical retaining sleeve 92. The latter is provided with a barrel-shaped extension 93 on which is loosely mounted a thrust bearing 94, the purpose of which will later be described.

A combined clutch and gear member 95 is rigidly fixed to the outer face and adjacent the periphery of the weight-carrying member 85 by means of bolts 96. The outer periphery of the member 95 is shaped to form a spur gear 97 and is provided with an inwardly extending annular flange 98 spaced apart from, and forming a recess 100 between the outer face of the member 85. The inner face of the flange is provided with an annular frictional element 98ª secured thereto by means of rivets 99. An annular disc 101 is disposed within the recess 100 and carries a frictional element 102 fixed on its outer face by means of rivets 103. The inner periphery of disc 101 is provided with teeth to form an internal gear 104 which meshes with the gear 88' to prevent relative rotation of the gear 88' and disc 101, but permitting longitudinal movement therebetween. The opposed faces of the frictional elements 98ª and 102 are adapted to receive a portion of the disc 78 adjacent its periphery and to permit relative rotation therebetween so long as the clutch 76 is in open position.

The frictional engagement of the clutch elements is obtained by means of rocking levers 105 provided with centrifugal weights 107 carried by arms 106. The levers 105 are pivotally mounted on axles 114, disposed between pairs of radial projections 109 and 111 integral with the inner face of member 85. Projections 112 are provided on the rocking levers for engagement with longitudinally movable pins 113 disposed in transverse openings 115 in the member 85, the inner ends of said pins having engagement with disc 101. If desired, spring means may be used to constantly urge the levers 105 into contact position with a predetermined pressure. However, the clutch faces may be so designed as to constantly exert a small amount of frictional pressure one against the other even when the weighted levers are held in ineffective position, and in this case the spring means are not necessary. The proper number of rocking weighted levers are employed to distribute the pressure uniformly about the clutch discs. The levers may be moved in a counter-clockwise direction by moving thrust bearing 94 outwardly and into engagement with the cooperating arms of the levers. Any convenient manual means (not shown) may be employed for moving the bearing 94 into or out of contact with the levers.

A speed increasing connection is provided between the supercharger rotor and the novel clutch means whereby the rotor may be driven at a very high rate of speed. The rotor 51 is drivably connected to the gear 97 formed on the member 95 through pinions 116 and 116ª (Figs. 1 and 3) rigidly mounted on the inner ends of shafts 117 and 117ª. The latter are rotatably supported in bearings 118 and 118ª mounted in a bracket 119 fixed to the casing 49 by means of bolts 121. The bearings 118 and 118ª are retained in their proper position by means of sleeves 122 and 122ª and threaded means 123 and 123ª, respectively. The outer ends of the shafts 117 and 117ª are rotatably supported in bearings 124 and 124ª, respectively, mounted in the casing 49 and are provided with gears 125 and 125ª loosely mounted thereon and drivably connected to the cooperating pinions on the opposite ends of the shafts by frictional means 126.

Each of the frictional means 126 comprises a plurality of discs 128 having their outer peripheries fixed to the inner surface of the gear, and alternate discs 129 have their inner peripheries fixed to the adjacent shaft 117 or 117ª. Discs 128 and 129 are maintained in frictional engagement one with the other by means of springs 131. The latter are positioned about the respective shafts and maintained in proper spaced relation by cup members 132 and pins 133 fixed to the outer face of the respective gear members 116 and 116ª. Gears 125 and 125ª are positioned to mesh with a gear 134 secured to the rotor shaft 135. By loosely mounting the gears 125 and 125ª on their respective shafts and providing a resilient driving connection between the respective gears on the opposite ends of said shafts, the gears 125 and 125ª may automatically adjust their positions with respect to the cooperating teeth of the gear 134 disposed on the rotor shaft. The inner end of the rotor shaft 135 is provided with a bearing 136 mounted in the bracket 119 and its outer end is rotatably supported in bearing 137 disposed in the rotor casing 49.

The supercharger casing 49 is provided with an air intake 138 and with a collector 139. A supply pipe or duct 141 leading from the collector 139 is connected to one side of an inter-cooler 142 (which is shown diagrammatically), the cooler being connected in any suitable manner to the intake of the carburetor 35 by means of a Y-connection 144. An automatic valve such as shown at 147 is provided within the Y-shaped connection for admitting atmospheric pressure to the carburetor through opening 148, or air under pressure from the supercharger by way of the cooler 142 and opening 149. The opening 148 may be provided with a heater (not shown) of a suitable type for supplying heated air to the carburetor in cold weather.

Suitable manual or automatic means may be provided at the supercharger intake 138 for controlling the supply of air to the supercharger. For this purpose a manually operable valve such as shown at 151 may be provided in intake 138 or automatic means of the barometric type, such as is diagrammatically shown at 152, may be provided for controlling the supply of air to the intake. The barometric device illustrated comprises a sealed expansible bellows 153 which has one end secured to casing 154 and its free end in contact with the end of lever 156 whereby expansion of the bellows at low atmospheric pressures will open the valve 151 and permit additional air to enter through openings 157.

In operation, the starter 47 is actuated whereupon member 52 engages the jaw 53 and rotates the crank shaft gear 15 through the gearing above described, until the engine 10 is started. The impeller 34 is driven by the gear 15 and constitutes a continuously operable built-in supercharger for supplying fuel to the engine cylinders 30 by way of the diffuser 37, collector 38, and fuel pipes 42.

During the foregoing operation, the supercharger 49 remains in a disconnected relation with the engine and therefore the impeller 34 is supplied with fuel through the carburetor 35 at atmospheric pressure by way of the opening 148 of the Y-connection 144. When an altitude is reached such that the member 34 is ineffective to maintain the desired pressure in the intake, the operator partially opens the throttle valve 151, or any barometric device, as indicated at 152, may be used to automatically open valve 151 and permit air to enter intake 138. Bearing 94 is now manually moved out of contact with the levers 105 to permit a free action of the centrifugal weights 107 whereby the clutch is engaged to drive the second supercharger by way of the continuously rotating shaft 63, gear 71, pinion 73, clutch 76, gear 97, pinions 116 and 116ª, shafts 117 and 117ª, gears 125 and 125ª, and gear 134 of the rotor shaft 135. The second supercharger now coacts with the first to provide the desired pressure in the intake manifold. The effect of the second supercharger may now be varied as desired by controlling the position of valve 151. The pressure of the air passing through cooler 142 will automatically close valve 147, which remains closed until such time as the control 94 is actuated to move the centrifugal weights 107 to inoperative position permitting the clutch to slip and the operation of rotor 51 to be discontinued. As soon as the speed of the second supercharger is retarded to the point where the pressure from the cooler is approximately the same as the atmospheric pressure, the valve 147 will operate to permit atmospheric pressure to pass to the carburetor 35 through the opening 148.

There is thus provided a method and apparatus for further supercharging an engine having a built-in supercharger and means for positively controlling the operation of the second supercharger without changing the structure of the engine.

An important feature of the invention resides in the novel manner in which the device is constructed and assembled into a unitary structure so that it may be readily attached to any known engine for which it may be designed.

Another advantage resides in the novel manner in which the starter mechanism is assembled with the unitary structure and adapted to utilize certain parts of the device in common with the second supercharger whereby the device may be built compact, light of weight, and particularly adapted for use where compactness and weight are important factors in the design of the equipment.

While I have illustrated but one embodiment of this invention in connection with a radial engine, it will be apparent to those skilled in the art that the invention may be readily applied to other types of internal combustion engines. Other changes, modifications, substitutions, additions, and omissions may be made in the structure described without departing from the spirit and scope of the appended claims.

What is claimed is:

1. In an apparatus of the class described in combination with the crank shaft of an internal combustion engine, a carburetor for mixing fuel and air for delivery to the cylinders of the engine, means continuously driven by the crank shaft and interposed between said carburetor and cylinders for compressing said mixture and for delivering the same to said cylinders, manually engageable means driven by the crank shaft for supplying air under pressure to said carburetor whereby the mixture delivered by the said continuously driven means is introduced into the cylinders at an increased pressure, means forming an atmospheric opening to said carburetor, a valve for controlling the opening, and a barometric actuated valve for controlling the amount of air supplied to the carburetor by the second compressing means in accordance with atmospheric pressure.

2. In combination with an internal combustion engine, a supercharger continuously driven thereby having its outlet connected with the engine, a carburetor having its outlet connected to the supercharger inlet, a second supercharger having its outlet communicating with the carburetor inlet, a clutch for operatively connecting the second supercharger to the engine at the will of the operator, barometric means for controlling the air inlet to the second supercharger in accordance with atmospheric pressure, and an automatic valve between the carburetor and second supercharger arranged to admit atmospheric air when the pressure between the carburetor and second supercharger is less than atmospheric pressure.

3. In combination with an internal combustion engine, a supercharger continuously driven thereby having its outlet connected with the engine, a carburetor having its outlet connected to the supercharger inlet, a second supercharger having its outlet communicating with the carburetor inlet, an atmospheric opening between the carburetor and the second supercharger, an automatic valve controlling the opening, an intercooler interposed between the second supercharger and the carburetor, a clutch for operatively connecting the second supercharger to the engine at the will of the operator, and barometric means for automatically controlling the air inlet to the second supercharger in accordance with atmospheric pressure.

4. In combination with an internal combustion engine, a supercharger having its outlet connected with the engine and arranged to be continuously driven thereby, a carburetor having its outlet connected to the supercharger inlet, said carburetor having two inlet passages, a second supercharger having its outlet in communication with one of said inlet passages, an intercooler interposed between the second supercharger and the carburetor, a clutch for operatively connecting the second supercharger to the engine at the will of the operator, a valve arranged in the second supercharger inlet adapted to control the air supply to the second supercharger, and an automatic pressure actuated valve adapted to control both of said carburetor passages in a manner to close one passage when the other is open.

5. In combination with an internal combustion engine, a supercharger continuously driven thereby having its outlet connected with the engine, a carburetor having its outlet connected to the supercharger inlet, a second supercharger having its outlet communicating with the carburetor inlet, an atmospheric opening between the carburetor and the second supercharger, an inwardly opening flapper valve having one edge hinged adjacent said opening for controlling the same, an intercooler between the second supercharger and the carburetor, a clutch for operatively connecting the second supercharger to the engine at the will of the operator, and barometric means for automatically controlling the air inlet to the second supercharger in accordance with atmospheric pressure.

6. In combination with an internal combustion engine, a supercharger having its outlet connected with the engine and arranged to be continuously driven thereby, a carburetor having its outlet connected to the supercharger inlet, said carburetor having two inlet passages with intersecting side walls, a second supercharger having its outlet in communication with one of said inlet passages, an intercooler interposed between the second supercharger and carburetor, a clutch for operatively connecting the second supercharger to the engine at the will of the operator, a valve arranged in the second supercharger inlet adapted to control the air supply to the second supercharger, and an inwardly opening flapper valve hinged at the intersection of the intake passage side walls adapted to control both of said passages in a manner to close one passage when the other is open.

CHARLES RAYMOND WASEIGE.